US011256726B2

(12) United States Patent
Atadan et al.

(10) Patent No.: US 11,256,726 B2
(45) Date of Patent: Feb. 22, 2022

(54) INTERACTING WITH OBJECTS BASED ON GEOLOCATION

(71) Applicant: Trellist Marketing and Technology, Wilmington, DE (US)

(72) Inventors: Thomas A. Atadan, New Castle, DE (US); David E. Atadan, Chadds Ford, PA (US); Jie Yang, Wilmington, DE (US)

(73) Assignee: TRELLIST MARKETING AND TECHNOLOGY, Wilmington, DE (US)

( * ) Notice: Subject to any disclaimer, the term of this patent is extended or adjusted under 35 U.S.C. 154(b) by 406 days.

(21) Appl. No.: 15/846,736

(22) Filed: Dec. 19, 2017

(65) Prior Publication Data

US 2018/0173724 A1 Jun. 21, 2018

Related U.S. Application Data

(60) Provisional application No. 62/436,156, filed on Dec. 19, 2016.

(51) Int. Cl.
*G06F 16/30* (2019.01)
*G06F 16/29* (2019.01)
(Continued)

(52) U.S. Cl.
CPC .......... *G06F 16/29* (2019.01); *G06F 16/9535* (2019.01); *G06F 16/9537* (2019.01); *G06Q 30/0267* (2013.01); *G06Q 30/0277* (2013.01)

(58) Field of Classification Search
CPC . G06F 16/29; G06F 16/9537; G06Q 30/0267; G06Q 30/0277
See application file for complete search history.

(56) References Cited

U.S. PATENT DOCUMENTS

2007/0112729 A1* 5/2007 Wiseman ............ G06F 16/9537
2008/0245863 A1* 10/2008 Buchheit ................ G06Q 30/06
235/383

(Continued)

OTHER PUBLICATIONS

Article entitled "Location-Aware Shopping Assistance: Evaluation of a Decision-Theoretic Approach", by Bohnenberger et al., dated 2002.*

(Continued)

*Primary Examiner* — Mahesh H Dwivedi
(74) *Attorney, Agent, or Firm* — Troutman Pepper Hamilton Sanders LLP

(57) ABSTRACT

A computer-implemented method for providing geographically targeted information corresponding to physical objects to a plurality of community members includes creating a database of physical object profiles corresponding to a plurality of physical objects, wherein each physical object profile comprises descriptive information corresponding to a physical object and a transitory geographic location associated with the physical object. An indication of a geographic location of a community member is received. Based on this indication, one or more item profiles in the database of physical object profiles within a predetermined geographic proximity to the community member are identified. Then, the identified profiles are transmitted to the community member.

7 Claims, 9 Drawing Sheets

(51) Int. Cl.
*G06Q 30/02* (2012.01)
*G06F 16/9535* (2019.01)
*G06F 16/9537* (2019.01)

(56) References Cited

U.S. PATENT DOCUMENTS

| | | | | |
|---|---|---|---|---|
| 2009/0085745 | A1* | 4/2009 | Gupta | G06Q 10/087 340/572.1 |
| 2011/0145234 | A1* | 6/2011 | Hu | G06F 16/9535 707/728 |
| 2012/0303626 | A1* | 11/2012 | Friedmann | G06F 16/00 707/740 |
| 2013/0132430 | A1* | 5/2013 | Platt | G09B 29/007 707/770 |
| 2013/0282533 | A1* | 10/2013 | Foran-Owens | G06Q 30/0641 705/27.1 |
| 2014/0278976 | A1* | 9/2014 | Braytenbaum | G06Q 30/0255 705/14.53 |
| 2014/0342760 | A1* | 11/2014 | Moldavsky | H04W 4/80 455/456.3 |
| 2015/0310492 | A1* | 10/2015 | Zewin | H04W 4/029 705/14.58 |
| 2015/0310556 | A1* | 10/2015 | Kiper | G06Q 30/0283 705/4 |
| 2016/0034996 | A1* | 2/2016 | Min | G06Q 40/025 705/26.61 |
| 2016/0135001 | A1* | 5/2016 | Kao | G06Q 30/02 455/456.1 |
| 2016/0292740 | A1* | 10/2016 | Akhavan-Saraf | H04W 4/80 |
| 2017/0295478 | A1* | 10/2017 | Jaggi | G06F 16/248 |

OTHER PUBLICATIONS

Article entitled "Beacon for Proximity Target Marketing", dated May 2016, by Alluwar et al.*

Article entitled "Can I Use Amazon Affiliate Links in YouTube Videos", dated Nov. 8, 2016, by Tokmakov.*

Article entitled "Ford to use Beacons to Beckon Buyers", by Zoia, dated Jun. 15, 2015 (Year: 2015).*

* cited by examiner

INTERACTING WITH OBJECTS BASED ON GEOLOCATION

CROSS REFERENCE TO RELATED APPLICATIONS

This application claims the benefit of U.S. Provisional Patent Application Ser. No. 62/436,156, filed on Dec. 19, 2016, entitled "Interacting with Objects Based on Geolocation," the entire contents of which are hereby incorporated by reference herein.

TECHNICAL FIELD

The present invention relates generally to computer-based methods, systems, and apparatuses which allow users to interact with objects based on geolocation. The techniques described herein may be applied, for example, to facilitate sales processes involving geolocation and content publications related to the objects.

BACKGROUND

Current technology connects users with other users to then participate in activities or connect users with media placements based on geolocation and relevant criteria or affinity. What is not covered is a community of users curating temporary points of interest or inventory, objects, for other users to interact with based on their geolocation. This important distinction creates new opportunities for customer experiences and adds a new digital dimension to what were formerly stationary, limited experiences such as, for example, car or trade shows, historical sites, and dynamic phenomena. These points of interest curated by users create opportunities for, in one example, ecommerce experiences that were previously unexplored. Creating dynamic and exclusive ecommerce experiences based on an associated object's geolocation could potentially produce tailored, unique, and new ecommerce portal where the purchase a customer wants to make is available to them digitally, immediately when they want, precisely because of their current location.

Accordingly, it is desired to create technology that blends the power of geolocation data with information gathering, ecommerce, and social collaboration functions in a manner that was previously only accomplished by querying search engines or browsing static marketplaces online.

SUMMARY

Embodiments of the present invention address and overcome one or more of the above shortcomings and drawbacks, by providing computer-based methods, systems, and apparatuses for interacting with objects based on geolocation, facilitating sales processes involving geolocation, and contributing to content feeds via financial transactions.

According to some embodiments, a computer-implemented method for providing geographically targeted information corresponding to physical objects to community members includes creating a database of physical object profiles corresponding to physical objects, wherein each physical object profile comprises descriptive information corresponding to a physical object and a transitory geographic location associated with the physical object. An indication of a geographic location of a community member is received. Based on this indication, one or more item profiles in the database of physical object profiles within a predetermined geographic proximity to the community member are identified. Then, the identified profiles are transmitted to the community member.

According to other embodiments, a computer-implemented method for providing geographically targeted information corresponding to physical objects to community members includes creating a digital profile associated with a physical object and updating the digital profile associated with the physical object based on a first submission from a community member. The first submission comprises a transitory geographic location associated with the physical object. Next, the digital profile associated with the physical object based on a second submission from the community member is updated to specify in the digital profile that the physical object is available for purchase. Then, the digital profile is transmitted to one or more targeted community members within a pre-defined proximity to the transitory geographic location.

According to other embodiments, a computer-implemented method for facilitating content posting on a user profile includes creating a user profile for a first user. This user profile comprises descriptive information associated with a physical object. A publicly accessible content feed is then generated based on the user profile. A request may then be received from a second user to post additional information associated with the physical object on the publicly accessible content feed. In response to the request, a financial transaction may be facilitated between the first user and the second user. In response to successful completion of the financial transaction, the second user is granted permission to post content directly on the publicly accessible content feed.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to delivering geographically relevant information to members of a community. According to some embodiments, community members can interact with a cloud-based system to supply a transitory geographic location for a physical object, along with some descriptive information about the object. Based on the supplied location, the descriptive information may be sent to nearby community members. In some embodiments, part of the descriptive information may include an indication that the object or some related goods or services are available for purchase. The system may then facilitate a financial transaction between the community members to complete the purchase. In other embodiments, each community member has a publicly accessible content feed that may be used by authorized third parties for content publishing. The information provided by the third parties may be, for example, related to physical objects tracked by the system (e.g., related brand information or advertising).

Traditional geolocation-based tracking systems generally focused on media or users. Physical objects are a new type of entity that can create new experiences for users by dynamically populating an immediate, interactive digital world. For example, ecommerce experiences associated with physical objects can supply users with the ability to purchase at a uniquely advantageous time (e.g., when a user is within proximity of what they want). These experiences are different than conventional ecommerce solution because they are facilitated by geolocation rather than a static web interface and traditional browsing after querying. Moreover, the techniques described herein may also provide benefits to content collaboration because the physical objects can become the ideal brand platforms for businesses due to very relevant geolocations of points of interest. For example, if relevant consumers meet consistently at a geolocation, it follows that the geolocation would be valuable to advertisers.

Figure 1:
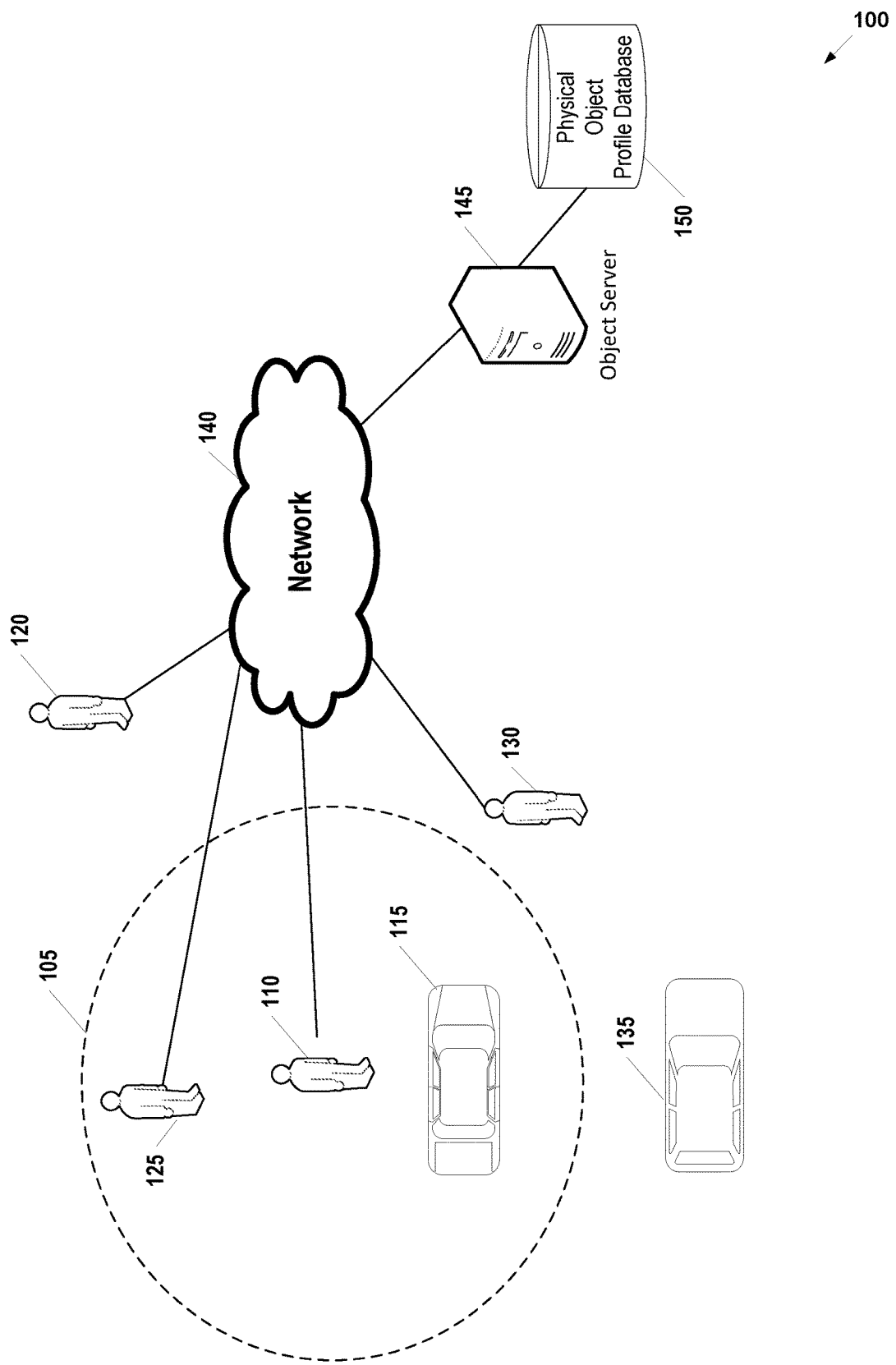
FIG. 1 provides a conceptual diagram of a system for providing geographically targeted information corresponding to physical objects to a plurality of community members, according to some embodiments FIG. 2 provides a flow chart illustrating a computer-implemented method for providing geographically targeted information corresponding to physical objects to a plurality of community members, according to some embodiments.

FIG. 1 provides a conceptual diagram of a system 100 for providing geographically targeted information corresponding to physical objects to a plurality of community members, according to some embodiments. In the example of FIG. 1, there are four community members: community member 110, community member 120, community member 125, and community member 130. The term "community" in this context refers to any collection of users linked by one or more interests. For example, a community may exist for a group of automotive customization enthusiasts. In some embodiments, users join the community using an opt-in procedure. For example, a user may send an email or another electronic message to an administrator of the group. In other embodiments, the process of joining a community can be more automated. For example, to continue with the automotive customization example, a user may install an automotive-centric app on his or her phone. This app then provides the user with access to the customization community and possibly other auto-centric communities.

In FIG. 1, the four community members 110, 120, 125, and 130 are connected to an Object Server 145 over a Network 140. Briefly, the community members 110, 120, 125, and 130 exchange information related to one or more physical objects with the Object Server 145. In FIG. 1, two physical objects are shown: automobile 115 and automobile 135. It should be noted that the example shown in FIG. 1 is merely for illustration purposes, and the general concept can be extended to any number or type of physical object. As explained in greater detail below, part of the information exchanged between the community members 110, 120, 125, and 130 and the object server includes location information corresponding to automobile 115 and automobile 135. Based on this location information, community members in proximity to the relevant physical object may be alerted with relevant information. For example, in FIG. 1, a predetermined geographic area 105 is defined for community member 110. Community member 110 receives information on automobile 115 because it is within the area 105. Similar geographic areas may be defined for other community members 120, 125, 130 based on their respective locations.

Network 140 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between the Object Server 145 and mobile devices or other computers operated by the community members 110, 120, 125, and 130. The Network 140 may be wired, wireless, or a combination thereof. Wired connections may be implemented using Ethernet, Universal Serial Bus (USB), RJ-11, or any other wired connection generally known in the art. Wireless connections may be implemented using Wi-Fi, WiMAX, and Bluetooth, infrared, cellular networks, satellite, or any other wireless connection methodology generally known in the art. Additionally, several networks may work alone or in communication with each other to facilitate communication in the Network 140.

The Object Server 145 is operably coupled to a Database 150 that profiles associated with physical objects. Each physical object profile in the database comprises descriptive information corresponding to a physical object. This descriptive information may be stored in the form of labels. For example, for an automobile, the labels may include "automobile," the model of the automobile, and the automobile's color.

Each physical object profile in the Database 150 also includes a transitory geographic location associated with the physical object. The term "transitory geographic location," as used herein, refers to a geographic location that is temporary by design. It may be implemented, for example, by recording the creation time of each location in the database and setting a maximum "time-to-live" for the location value. Thus, once the difference between the current time and the creation time is equal to (or greater than) the time-to-live, the corresponding geographic location is marked as outdated, for example, by setting the location to a null value or by deleting the entire database record. In some embodiments, a process is executed periodically at fixed times, dates, or intervals to search for and purge outdated geographic locations in the database.

In some embodiments, the transitory geographic location of the physical object is specified by one or more of the community members 110, 120, 125, and 130. In general, any technique known in the art may be used to provide the location. For example, in one embodiment, the Object Server 145 receives an image of the physical object from one of community members 110, 120, 125, and 130. Geotag information is determined based on metadata of the image. Then, the transitory geographic location based on the geotag information.

Figure 2:
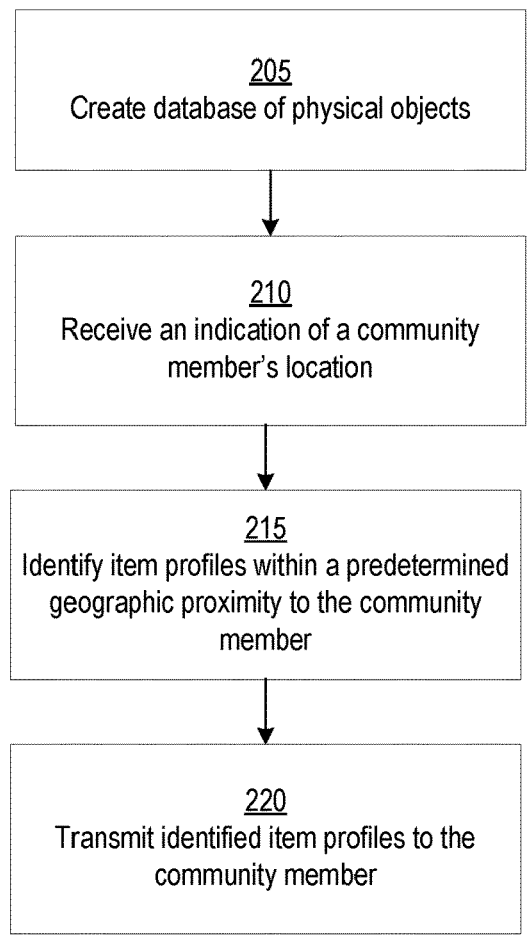

Based on the transitory geographic information included in each physical object profile in the Database 150, the Object Server 145 identifies relevant geographic areas for delivering object-related information (e.g., area 105 for automobile 115). The general process employed by the Object Server 145 is described in the flow chart 200 shown in FIG. 2. Starting at step 205, a database of physical object profiles corresponding to a plurality of physical objects is created (i.e., Database 150). In some embodiments, the database is populated solely based on input for the community members. Thus, it begins in an empty state and gradually, over time, grows. Alternatively (or additionally), a system administrator may create one or more profiles as a starting point.

Once the database is created and populated with physical object profiles, at step 210, an indication of a geographic location of a community member is received. In some embodiments, the location is received via a search request from the community member. For example, if the community member searches for aftermarket automotive parts via a website or an app, techniques generally known in the art for determining the community member's geographic location may be employed to determine location based on the search request. For example, the geographic location of the community member may be derived based on device configuration information associated with the mobile device. In other embodiments, the community member may explicitly provide his or her geographic location, for example, via a web-based form.

Based on the community member's location, one or more item profiles within a predetermined geographic proximity to the community member are identified from the database at step 215. In general, any technique generally known in the art may be used to define proximity. For example, in some embodiments, a radius value (e.g., 5 miles) is set and, using the location of the community member as a center point, a circle is defined. Any point within this circle is considered "within a predetermined geographic proximity to the community." Other criteria may be used for further refine the relationship between the community member and the profiles in the database. For example, in one embodiment, the geographic orientation of the community member with respect to the each of the physical objects is considered during profile selection.

At step 220, the profiles identified at step 215 are transmitted to the community member. If the community member performed a search for the profiles, the profiles may be returned in response. In some embodiments, the profiles are transmitted to the community member as a "push" alert to the community member's mobile device. Thus, for example, the community member's mobile device may display an alert when the community member is within proximity to a particular object documented in the database. By selecting the alert, the community member may be presented with additional information on the object. In some embodiments, the identified object appears on the mobile device in the form of an advertisement.

One limitation of the technique described above with respect to FIG. 2 is that item profiles that are outside of the community member's geographic proximity are not provided to the community member, even if those item profiles are especially relevant to the community member's interests. For example, with reference to FIG. 1, the automobile 135 is outside of geographic proximity of community member 110; however, the make and model (or other characteristics) of the automobile 135 may correlate strongly to the interests of the community member 110. To address this deficiency, in some embodiments, extended geographic areas surrounding the user may be defined and searched for relevant item profiles. These extended geographic areas may be predefined for all users or, in some instances, the extended geographic areas may be user defined.

Once these additional item profiles in the extended area are identified, a scoring process may be applied to determine which profiles are relevant to the community member. During this scoring process, an affinity score is calculated for each additional item profile based on the descriptive information in the profiles and a list of interests corresponding to the community member. Once these affinity scores are calculated, the additional item profiles may be sorted based on the affinity score to yield a sorted set of additional item profiles. Profiles with affinity scores below a threshold value may be discarded and the remaining profiles may then be transmitted to the community using techniques which are similar to those discussed above with respect to step 220 of FIG. 2. The affinity score provides a numerical representation of the profile's relevance. In one embodiment, the affinity score is determined by assigning a numerical rating to each of the descriptive labels associated with the item profile. The numerical ratings that match profile information associated with the community member are then aggregated to yield the final score for the profile.

As an example of the affinity score, consider two item profiles. The first item profile has the following descriptive labels: automobile, Ford Mustang, aftermarket part, and supercharger. The second item profile has the following descriptive labels: farm machinery, tractor, and John Deer. Assume for this example that each label is given a rating of a "1." For a community member that has shown interest in purchasing an aftermarket supercharger for a Ford Mustang, the first item profile would be rated a "5" (i.e., aggregating the value of "1" for each label). Presuming the community interest does not have any interest in farm machinery, the second item profile may be rated a "0." Thus, the first item profile would be transmitted to the user, but not the first.

In the example presented above, each label was given a numerical rating of "1." However, in some embodiments of the present invention, each label may be set to different ratings based on criteria such as the specificity of the label. For example, automobile may be rated a "1," while Ford Mustang is rated a "3." Setting these labels may be performed manually by a user. Alternatively, a machine learning approach may be applied where a trained model assigns a rating to a label based on various criteria.

Figure 3:
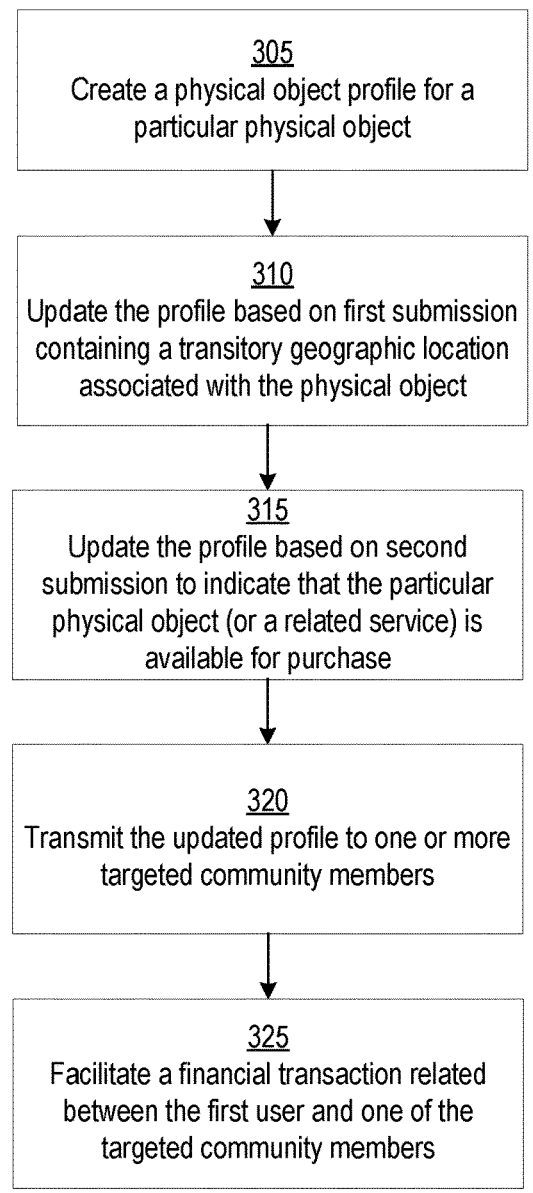
FIG. 3 illustrates a computer-implemented method for providing geographically targeted information corresponding to physical objects to a plurality of community members, according to some embodiments.

FIG. 3 illustrates a computer-implemented method 300 for providing geographically targeted information corresponding to physical objects to a plurality of community members, according to some embodiments. Starting at step 305, a physical object profile is created for a particular physical object. This physical object profile may include one or more default fields or, alternatively, all fields may be set of a null value. Next, at step 310, the profile is updated based on a first submission from a community member that includes the transitory geographic location associated with the physical object. Then, at step 315, the profile is updated again based on a second submission from the community member to specify in the digital profile that the physical object is available for purchase. Additionally, the second submission may comprise items for sale that do not require a geolocation but are just attached to the object profile and listed for sale (e.g., services related to the physical object). In some embodiments, the second submission comprises a hyperlink to a website comprising a listing of the physical object. This website may be, for example, hosted by the system hosting the profile database. Alternatively, the website may correspond to an online listing service such as eBay™ or Craigslist™.

It should be noted that the submissions described with respect to steps 310 and 315 are not necessary separate; in some embodiments, one submission may include both the location and the purchase listing. Also, the two submissions may come from different community members. For example, one community member may provide the location of an automobile and another community member may indicate that it's available for purchase.

Continuing with reference to FIG. 3, once the profile is updated, it is transmitted at step 320 to one or more targeted community members within a pre-defined proximity to the transitory geographic location. In some embodiments, the digital profile is transmitted to each targeted community member via a mobile application on a device used by the targeted community member. For example, community members may receive a push alert indicating that a nearby physical item is available for purchase. The community members may be targeted based on various criteria including past purchases, web search history, and general interests. In some embodiments, the techniques described above for affinity scoring are used to perform the targeting. More specifically, an affinity score is calculated for each nearby community member with respect to the descriptive information in the physical item profile. Then, community members having affinity scores above a threshold value may be targeted for receipt of the profile.

Next, at step 325, a financial transaction is facilitated between the community member and one of the targeted community members to purchase the physical object. Facilitation of this transaction can be performed using any techniques or technology generally known in the art. For example, in some embodiments, to finalize a transaction, one community member may send the other payment via a payment service integrated with system hosting the database. This system may be proprietary or third party payment services such as PayPal™ may be employed.

Figure 4:
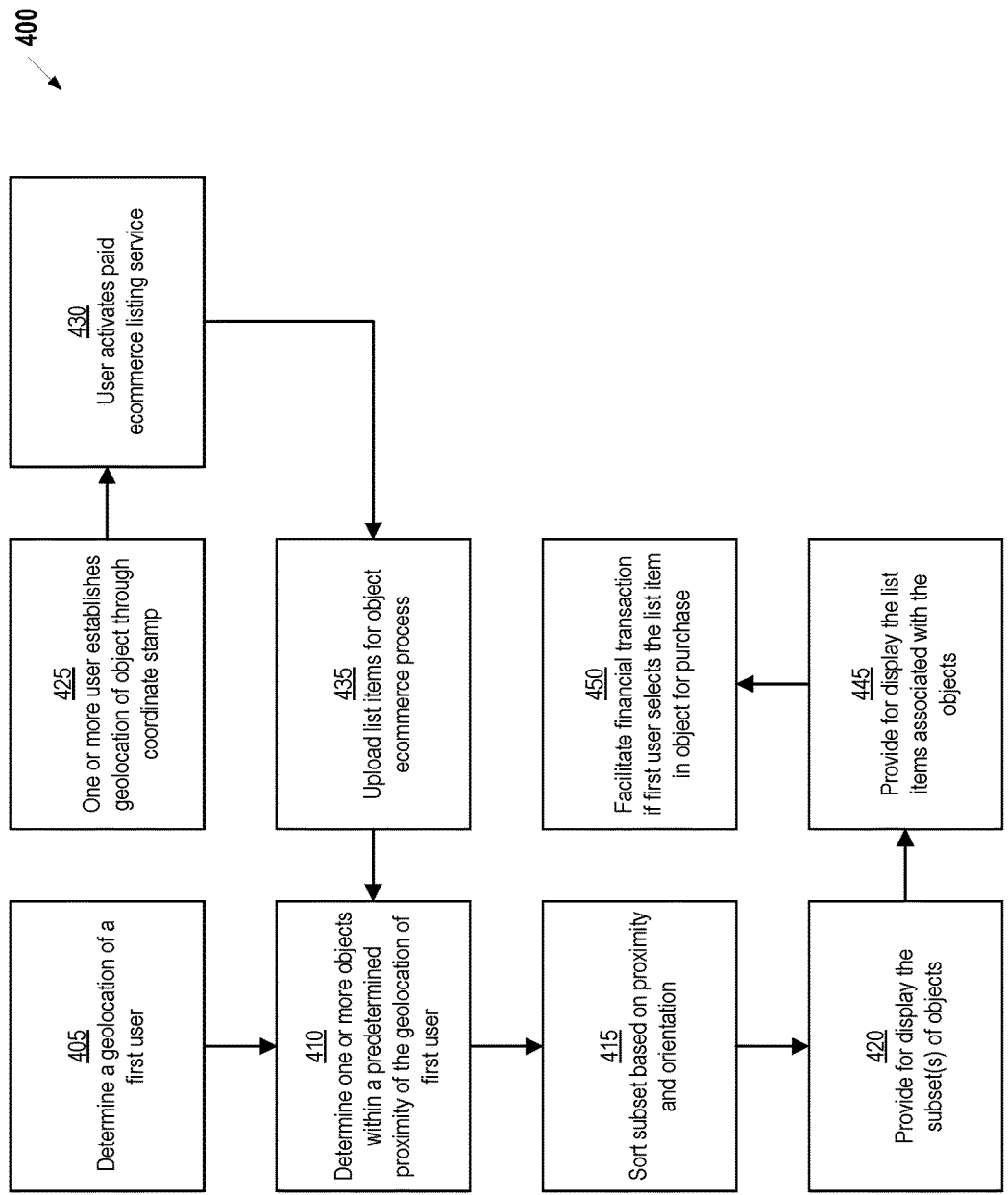
FIG. 4 provides a flowchart which illustrates how the techniques discussed above with respect to FIGS. 2 and 3 can be applied, according to some embodiments.

FIG. 4 provides a flowchart 400 which illustrates how the techniques discussed above with respect to FIGS. 2 and 3 can be applied, according to some embodiments. Conventional digital sales are limited by the fact that a query must be made or a specific web page must be visited in order to access the sales/checkout process. Using the techniques shown in FIG. 4, this sales/checkout process may be refined based on geolocation. For example, rather than visiting a website or querying in a search engine the user simply opens their app and is connected with the specific ecommerce portal simply based on their proximity to the geolocation of the digital profile that contains the ecommerce portal.

In FIG. 4, steps 405-420 describe the general process of sending user information corresponding to nearby physical objects. Thus, at step 405 the geolocation of the user is determined and, at step 410, nearby objects (i.e., within the predetermined proximity of the geolocation) are identified in the database. The identified subset of objects are sorted at step 415 based on proximity and orientation to the user before finally be provided to the user at step 420.

Steps 425-435 show how the information in the object database can be updated by another user via an ecommerce listing service (either provided by the operator of the database or a third party service such as eBay™). At step 425, the second user establishes the location of a particular object by providing geographic coordinates (a "coordinate stamp"), either through direct input of the coordinates or through some automatic means (e.g., GPS, image geocode data, etc.). Next, at step 430, the second user actives the ecommerce listing service, for example, by logging in to the service's website with the second user's credentials or using an app on the second user's phone. Then, at step 435, the ecommerce listing service uploads the second user's item (and possibly other items) to the physical object database used at step 410. This upload creates or updates a record of the physical object, with its geolocation and information regarding the availability of the object (or a related product or service) for purchase.

Steps 445-450 illustrate how the items listed by the second user can be purchased by the first user that is nearby the related physical object. At step 445, the items available for purchase are specifically listed for the first user. This listing can be part of the display of all nearby objects, presented to the first user in step 420. Alternatively, a separate display may be provided to the first user. For example, the first user may use a mobile app to see all nearby objects or related items. By activating a button or other interactive element in the app, the user may see items that are available for purchase. Moreover, these two concepts can be combined. For example, the user may be presented with an indication that a particular vehicle is nearby at step 420. At step 445, by activating the functionality within the app, the user may see products or services related to the vehicle that are available for purchase. Finally at step 450, a financial transaction is facilitated between the first and second user if the first user selects the list item in object for purchase. In some embodiments, the second user or the ecommerce listing service may be compensated each time the user views the listing information or activates a link to the ecommerce listing site. In this way, a "pay-per-click" ecommerce model may be utilized.

Figure 5:
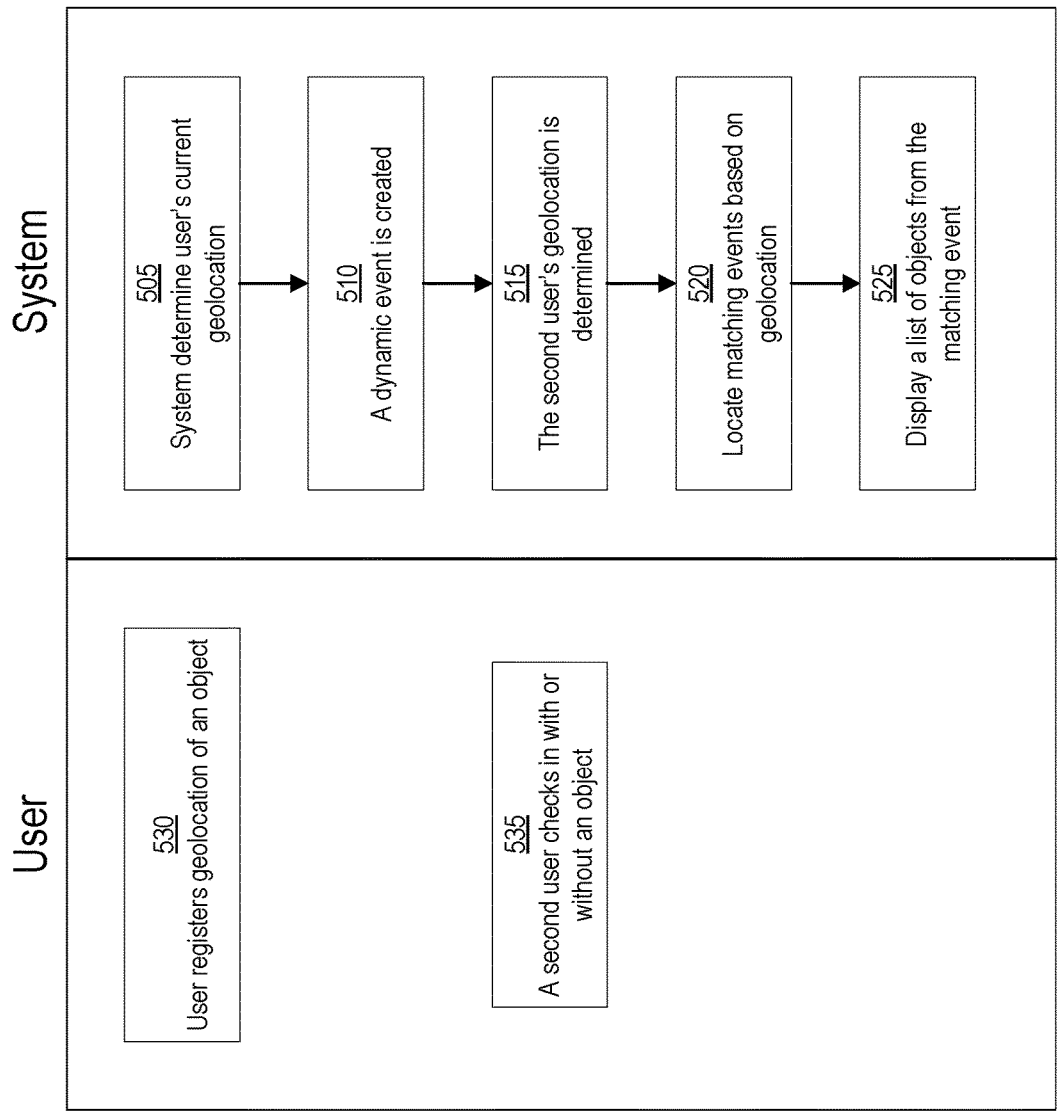
FIG. 5 provides an overview flowchart showing the parallel flows that users and the system follow, according to some embodiments.

FIG. 5 provides an overview flowchart 500 showing the parallel flows that users and the system follow, according to some embodiments. On the User side of the flowchart 500, a first user registers the object with the system during user activity 530. Then, as shown at user activity 535, a second user registers their own geolocation, which produces an interaction between the two entities. An optional next step for the second user is to purchase an item associated with an object. The System side of the flowchart 500 follows a technical sequence that differs slightly from the anecdotal. At step 505, in response to user activity 530, the system determines the user's current geolocation and creates a "dynamic event" at step 510.

The term dynamic event, as used herein, refers to a database entry created by the system in response to a user check-in. Rather than query the entire database of objects each time the system scans to see if an object is within range, a list of dynamic events is searched that comprises the list of physical objects (e.g., vehicles) that will likely be within proximity. This reduces the processing demand that querying the entire list of available objects would require. For example if a user is in Wilmington, Del., there may be a dynamic event that has a 50 mile radius and may contain 50 of the 200 vehicles checked-in within 100 miles of the user. Because the only dynamic event in range of they user's location would be the one in Wilmington, the user may only be served only the objects from that dynamic event, effectively reducing the amount of processing required by intelligently grouping objects.

Continuing with reference to FIG. 5, at step 515, in response to user activity 535, the second user's location is determined and, at step 520, the second user paired with the dynamic events created by other "check-ins." Finally, at step 525, the matching events are displayed to the second user as proximity results.

User content feeds have become a destination for users of apps and other digital platforms. Generally, the content is curated by an owner and others with administrative or moderator privileges. Brands often utilize the most popular feeds as a platform for marketing, but this requires transfer of media to an approved user. In some embodiments of the present invention, systems and methods are provided that allow a second user to create and publish content on any first users feed. This requires a small financial transaction (referred to herein as a "micro transaction") on the part of the second user suggesting the content and a simple approval from the first user who owns the feed.

Figure 6:
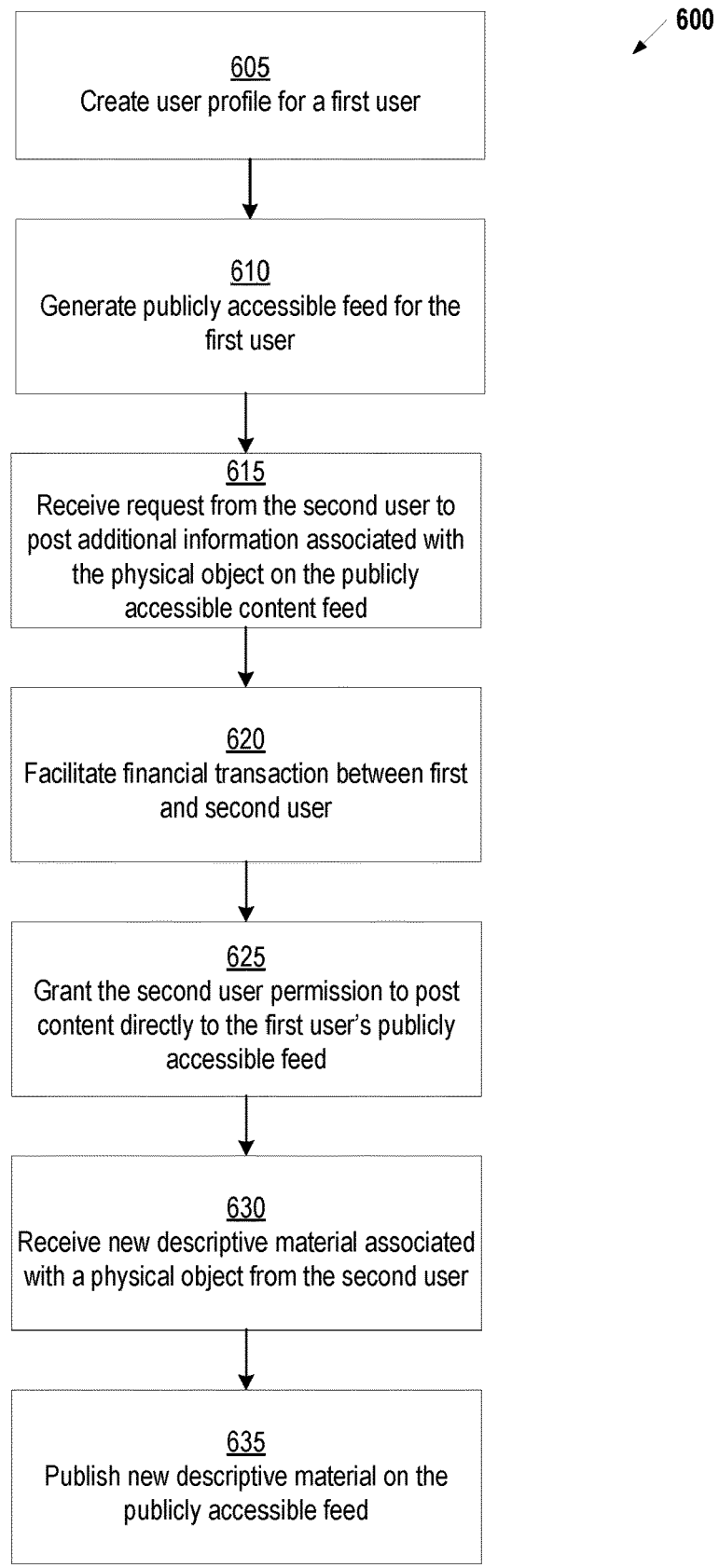
FIG. 6 illustrates a computer-implemented method for facilitating content posting on a user profile, according to some embodiments.

FIG. 6 illustrates a computer-implemented method 600 for facilitating content posting on a user profile, according to some embodiments. Starting at step 605, a user profile is created for a first user. The term "user profile," as used herein refers to any collection of data associated with the user. One example of a user profile is an account profile associated with a social media site. For the example shown in FIG. 6, the user profile includes descriptive information associated with a physical object. For example, the user profile may describe the first user's automobile (e.g., make and model information, color, mileage, etc.). At step 610, a publicly accessible content feed is generated based on the user profile. This content feed may include, for example, information from the user profile such as the descriptive information associated with a physical object. Additionally, the content feed may include blog posts, images, etc. created by the first user or otherwise selected by the first user for inclusion in the content feed.

Continuing with reference to FIG. 6, at step 615, a request is received from a second user to post additional information associated with the physical object on the publicly accessible content feed. Returning to the automobile example, the second user may be a mechanic requesting permission to post information on one or more mechanical upgrades to the automobiles of same make and model as the first user's automobile. At step 620, in response to the request, a financial transaction is facilitated between the first user and the second user. In some embodiments, the second user provides a flat fee to the first user for the ability to post. In other embodiments, the first user makes payment for each post to the content feed. Other types of financial transactions may also be employed including, for example, revenue sharing or pay-per-click based transactions.

In response to successful completion of the financial transaction, at step 625, the second user permission is granted to post content directly on the publicly accessible content feed. In general, permission may be granted using any technique known in the art. For example, in one embodiment, the second user is granted "secure delegated access" to the user account resources on behalf of the first user. If the second user does not have an account on system hosting the first user's account, a technique such as OAuth may be employed to grant authorization to the second user without sharing the first user's credentials. For example, using OAuth, an access token may be issued to a third party client with approval of the first user. The second user can then use the access token to access and post to the first user's content feed.

Continuing with reference to FIG. 6, at step 630, new descriptive material associated with the physical object is received from the second user (e.g., via a web-based form or through a different type of electronic communication). Then, at step 635, the new descriptive material is published on the publicly accessible content feed. In some embodiments, the new descriptive material is designated as an advertisement in the publicly accessible content feed.

In some embodiments of the method 600 set forth in FIG. 6, the publicly accessible content feed may be updated based on a submission from the first user or the second user comprising a transitory geographic location associated with the physical object. This submission may include, for example, an image of the physical object with metadata specifying the transitory geographic location. Using the proximity-based concepts discussed above with respect to FIGS. 2 and 3, the publicly accessible content feed may be transmitted as a push message to one or more additional users within a pre-defined proximity to the transitory geographic location.

Figure 7:
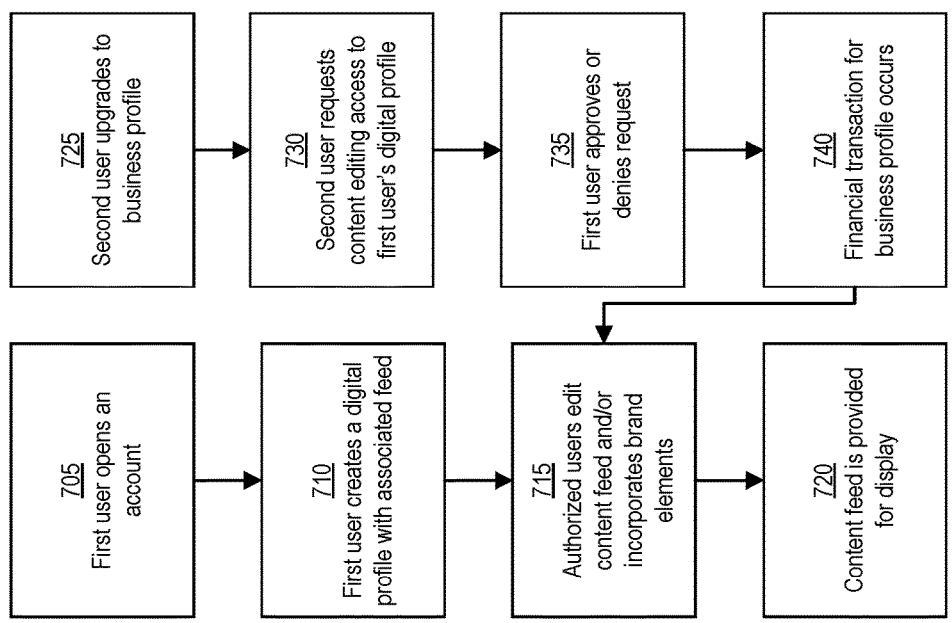
FIG. 7 provides an overview flowchart showing how a secondary user can edit a primary users content feed after a financial transaction and approval takes place.

FIG. 7 provides an overview flowchart 700 showing how a secondary user can edit a primary user's content feed after a financial transaction and approval takes place. Two parallel paths make up this diagram. The leftmost path (step 705-720) details how a user can create a profile and curate his or her own content. Thus, at step 705, the user opens an account and, at step 710, creates a digital profile associated with a publicly accessible content feed. At step 715, authorized users can edit this content feed and/or incorporate brand elements (e.g., logos, designs, products, etc.). Then, at step 720, the updated feed is provided for public display.

Continuing with reference to FIG. 7, the rightmost path (steps 725-740) involves a second user who has a profile with additional business capabilities. In this example, it assumed that there is a "business" account profile available for the second user which is designed to facilitate a content publishing transaction. This business account profile can vary from a typical user profile by providing additional functionality related to content publishing capabilities, tracking of financial transactions related to publishing, etc. At step 725, the second user upgrades to the business profile and, at step 730, the second user requests content editing access to the first user's digital profile. In some embodiments, this request could include details on brand elements that the second user wishes to use on the first user's feed. At step 735, the second user receives an indication of whether the first user approved or denied the request. This information may be provided, for example, via an interface associated with the second user's business account profile. Assuming that the first user approves the request, at step 740, a financial transaction between the two users is executed and tracked via the business account profile. The second user then becomes an "authorized user" capable of editing the first user's feed, as discussed above with reference to step 715.

Figure 8:
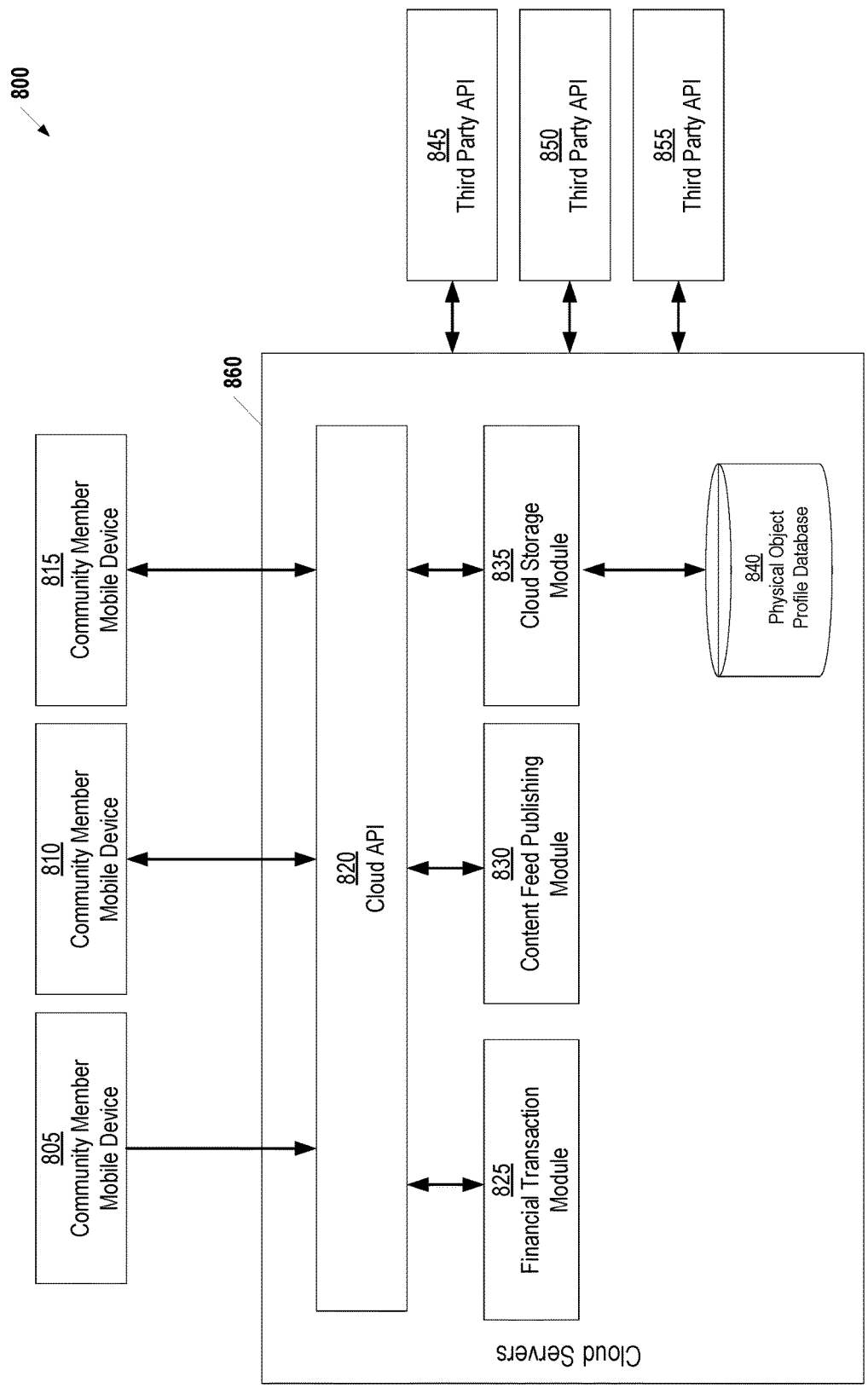
FIG. 8 provides a conceptual overview of how the techniques described herein may be implemented in a cloud-based server environment, in some embodiments of the present invention.

FIG. 8 provides a conceptual overview 800 of how the techniques described herein may be implemented in a cloud-based server environment, in some embodiments of the present invention. One or more Cloud-based Servers 860 provide storage of physical item profiles in a Database 840.

The Database 840 may be implemented using any technique known in the art. For example, in some embodiments, a SQL-based database such as Microsoft SQL Server may be used. In other embodiments No-SQL database with a table equivalent structure may be employed. As is understood in the art, the term "No-SQL" is used to define a class of data stores that are non-relational in their design. There are various types of No-SQL databases which may be generally grouped according to their underlying data model. These groupings may include databases that use column-based data models (e.g., Cassandra), document-based data models (e.g., MongoDB), key-value based data models (e.g., Redis), and/or graph-based data models (e.g., Allego). Any type of No-SQL database may be used to implement the various embodiments described herein. For example, in one embodiment, MongoDB software is used to provide the underlying functionality of the Database 840.

The Cloud-based Servers 860 include software modules for performing the various techniques discussed above with respect to FIGS. 1-7. The term software module, as used herein, refers to software which encapsulates code and data to implement a particular functionality. Three modules are shown in the example of FIG. 8. A Cloud Storage Module 835 interacts with the Database 840 to store and retrieve data related to, among other things, the physical object data records. A Financial Transaction Module 825 facilitates financial transactions between users, either directly or through the use of one or more Third Party Application Programming Interface (API) 845, 850, 855. Finally, a Content Feed Publishing Module 830 enables general content publishing as described above with reference to FIGS. 6 and 7. Similar to the Financial Transaction Module 825, the Content Feed Publishing Module 830 may implement the publishing functionality directly or Third Party APIs 845, 850, 855 may be used to publish using third party tools. It should be noted that the Modules 825, 830, 835 shown in FIG. 8 are only examples of the type of modules that may be implemented by the Cloud-based Servers 860. In other embodiments, additional modules may be added to supplement the functionality discussed above. For example, in some embodiments, a module may be provided which allows community members to message one another.

A plurality of Mobile Devices 805, 810, and 815 access the functionality provided by the Modules 825, 830, 835 through a Cloud API 820. The Cloud API 820 provides a set of functions, protocols, and tools for interacting with the Modules 825, 830, 835. It should be noted that, although FIG. 8 shows community members accessing the Cloud-based Servers 860 with Mobile Devices 805, 810, and 815, the Cloud API 820 allows the functionality of the Modules 825, 830, 835 to be accessed by any type of computing device. For example, a web-based client can be developed which allows community members to access the Cloud-based Servers 860 through a desktop computer. Furthermore, in some embodiments, the Cloud API 820 may be used to interact with third parties that are not community members. For example, in one embodiment, cookie exchanges or other advertisement-focused entities can use the Cloud API 820 to access data on physical object and interact with community members.

Figure 9:
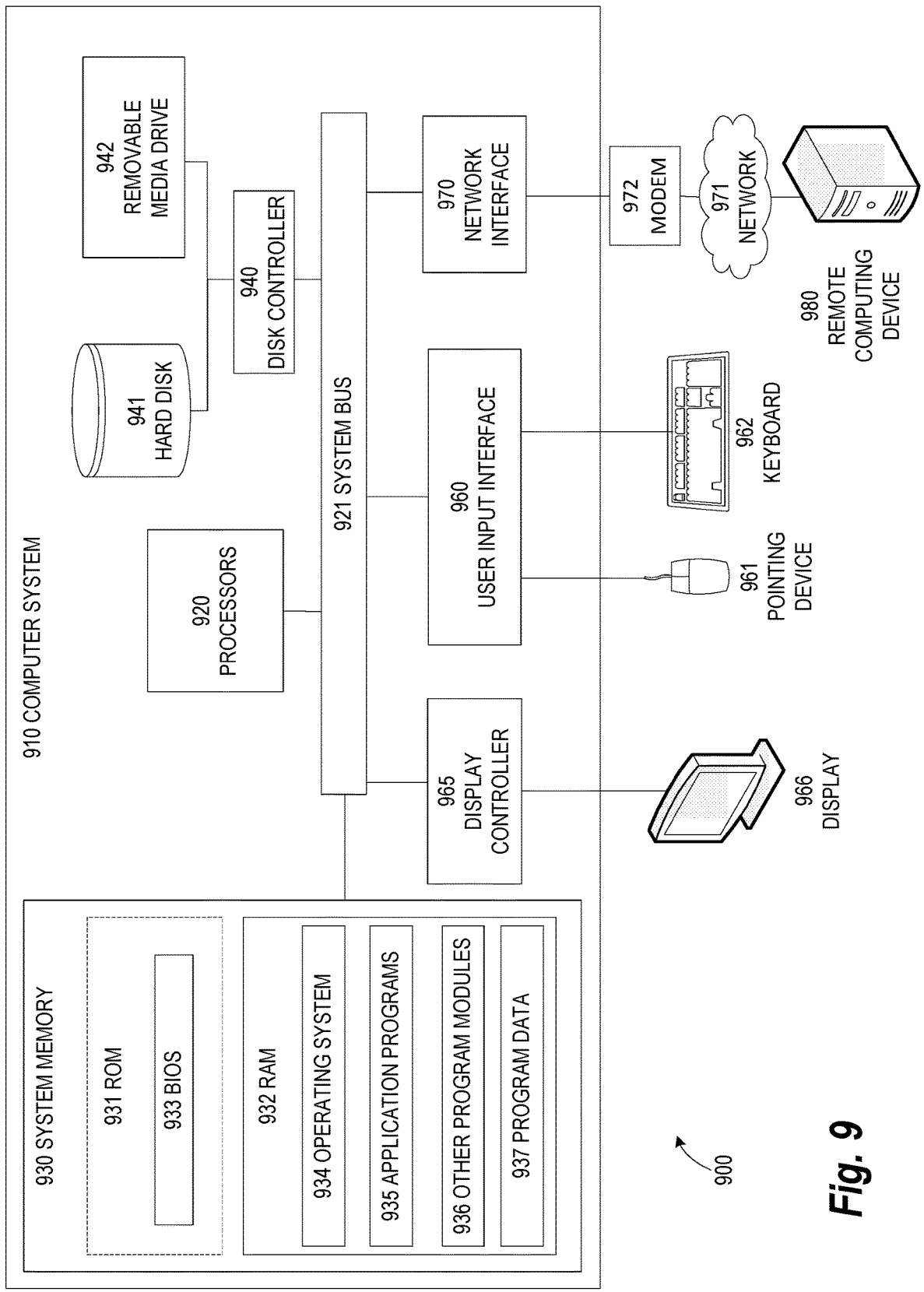
FIG. 9 illustrates an exemplary computing environment within which embodiments of the invention may be implemented.

FIG. 9 illustrates an exemplary computing environment 900 within which embodiments of the invention may be implemented. For example, this computing environment 900 may be used to implement the methods and processes described with respect to FIGS. 2-7 and/or one or more of the components illustrated in the systems 100 and 800 of FIGS. 1 and 8. The computing environment 900 may include computer system 910, which is one example of a computing system upon which embodiments of the invention may be implemented. Computers and computing environments, such as computer system 910 and computing environment 900, are known to those of skill in the art and thus are described briefly here.

As shown in FIG. 9, the computer system 910 may include a communication mechanism such as a bus 921 or other communication mechanism for communicating information within the computer system 910. The computer system 910 further includes one or more processors 920 coupled with the bus 921 for processing the information. The processors 920 may include one or more central processing units (CPUs), graphical processing units (GPUs), or any other processor known in the art.

The computer system 910 also includes a system memory 930 coupled to the bus 921 for storing information and instructions to be executed by processors 920. The system memory 930 may include computer readable storage media in the form of volatile and/or nonvolatile memory, such as read only memory (ROM) 931 and/or random access memory (RAM) 932. The system memory RAM 932 may include other dynamic storage device(s) (e.g., dynamic RAM, static RAM, and synchronous DRAM). The system memory ROM 931 may include other static storage device(s) (e.g., programmable ROM, erasable PROM, and electrically erasable PROM). In addition, the system memory 930 may be used for storing temporary variables or other intermediate information during the execution of instructions by the processors 920. A basic input/output system (BIOS) 933 containing the basic routines that help to transfer information between elements within computer system 910, such as during start-up, may be stored in ROM 931. RAM 932 may contain data and/or program modules that are immediately accessible to and/or presently being operated on by the processors 920. System memory 930 may additionally include, for example, operating system 934, application programs 935, other program modules 936 and program data 937.

The computer system 910 also includes a disk controller 940 coupled to the bus 921 to control one or more storage devices for storing information and instructions, such as a hard disk 941 and a removable media drive 942 (e.g., floppy disk drive, compact disc drive, tape drive, and/or solid state drive). The storage devices may be added to the computer system 910 using an appropriate device interface (e.g., a small computer system interface (SCSI), integrated device electronics (IDE), Universal Serial Bus (USB), or FireWire).

The computer system 910 may also include a display controller 965 coupled to the bus 921 to control a display 966, such as a cathode ray tube (CRT), liquid crystal display (LCD) or light-emitting diode (LED), for displaying information to a computer user. The computer system includes an input interface 960 and one or more input devices, such as a keyboard 962 and a pointing device 961, for interacting with a computer user and providing information to the processor 920. The pointing device 961, for example, may be a mouse, a trackball, or a pointing stick for communicating direction information and command selections to the processor 920 and for controlling cursor movement on the display 966. The display 966 may provide a touch screen interface which allows input to supplement or replace the communication of direction information and command selections by the pointing device 961.

The computer system 910 may perform a portion or all of the processing steps of embodiments of the invention in response to the processors 920 executing one or more sequences of one or more instructions contained in a memory, such as the system memory 930. Such instructions may be read into the system memory 930 from another computer readable medium, such as a hard disk 941 or a removable media drive 942. The hard disk 941 may contain one or more datastores and data files used by embodiments of the present invention. Datastore contents and data files may be encrypted to improve security. The processors 920 may also be employed in a multi-processing arrangement to execute the one or more sequences of instructions contained in system memory 930. In alternative embodiments, hard-wired circuitry may be used in place of or in combination with software instructions. Thus, embodiments are not limited to any specific combination of hardware circuitry and software.

As stated above, the computer system 910 may include at least one computer readable medium or memory for holding instructions programmed according to embodiments of the invention and for containing data structures, tables, records, or other data described herein. The term "computer readable medium" as used herein refers to any medium that participates in providing instructions to the processor 920 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 941 or removable media drive 942. Non-limiting examples of volatile media include dynamic memory, such as system memory 930. Non-limiting examples of transmission media include coaxial cables, copper wire, and fiber optics, including the wires that make up the bus 921. Transmission media may also take the form of acoustic or light waves, such as those generated during radio wave and infrared data communications.

The computing environment 900 may further include the computer system 910 operating in a networked environment using logical connections to one or more remote computers, such as remote computer 980. Remote computer 980 may be a personal computer (laptop or desktop), a mobile device, a server, a router, a network PC, a peer device or other common network node, and typically includes many or all of the elements described above relative to computer system 910. When used in a networking environment, computer system 910 may include modem 972 for establishing communications over a network 971, such as the Internet. Modem 972 may be connected to bus 921 via user network interface 970, or via another appropriate mechanism.

Network 971 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 910 and other computers (e.g., remote computer 980). The network 971 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 971.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes, and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method for providing geographically targeted information corresponding to physical objects to a plurality of community members, the method comprising:
   creating a digital profile associated with a physical object;
   updating the digital profile associated with the physical object based on a first submission from a community member, wherein the first submission comprises a transitory geographic location associated with the physical object;
   updating the digital profile associated with the physical object based on a second submission from the community member to specify in the digital profile that the physical object is available for purchase;
   transmitting the digital profile to a plurality of targeted community members within a pre-defined proximity to the transitory geographic location and above a threshold affinity score associated with the digital profile without receiving a search query from any one of the plurality of targeted community members and wherein for each of the plurality of community members, determining a unique affinity score based on descriptive information in the digital profile and a list of interests corresponding to the community member and identifying a subset of the community members as the targeted community members, wherein the unique affinity score corresponding to each community member in the subset is above a predetermined threshold value; and facilitating a transaction between the community member and one of the targeted community members to purchase the physical object, wherein another community member can update additional data associated with the physical object onto a content feed without using credential data associated with the content feed of the community member and wherein the another community member completes a financial transaction with the community member to update additional data associated with the physical object onto the content feed.

2. The method of claim 1, wherein the second submission comprises a hyperlink to a website comprising a listing of the physical object.

3. The method of claim 1, wherein the digital profile is transmitted to each targeted community member via a mobile application on a device used by the targeted community member.

4. The method of claim 1, wherein the affinity score is determined by:
   identifying a plurality of descriptive labels included in the descriptive information;
   assigning a numerical rating to each of the plurality of descriptive labels; and
   for each of the plurality of community members, determining the affinity score by aggregating the numerical rating from the each of the plurality of descriptive labels that match profile information associated with the community member.

5. The method of claim 4, wherein the physical object is an automobile and the plurality of descriptive labels comprise an automobile color and an automobile model.

6. The method of claim 1, wherein the first submission comprises an image of the physical object from the community member with metadata specifying the transitory geographic location.

7. The method of claim 1, further comprising:
   identifying mobile devices associated with the plurality of community members;
   determining each community member's proximity to the transitory geographic location
   based on device configuration information associated with the community member's mobile device.

* * * * *